United States Patent [19]
Nard

[11] 3,997,902
[45] Dec. 14, 1976

[54] TRANSMISSION OF RADIO NAVIGATION PHASE CORRECTIONS

[75] Inventor: Georges Nard, Nantes, France

[73] Assignee: Societe d'Etudes, Recherches et Constructions Electroniques-SERCEL, Carquefou, France

[22] Filed: June 28, 1974

[21] Appl. No.: 484,030

[30] Foreign Application Priority Data

July 3, 1973 France ............................. 73.24351

[52] U.S. Cl. .......................................... 343/105 R
[51] Int. Cl.$^2$ .......................................... G01S 1/30
[58] Field of Search ............................... 343/105 R

[56] References Cited
UNITED STATES PATENTS

| | | | |
|---|---|---|---|
| 3,715,758 | 2/1973 | Sender | 343/105 R |
| 3,774,211 | 11/1973 | Nard et al. | 343/105 R |

*Primary Examiner*—Maynard R. Wilbur
*Assistant Examiner*—Richard E. Berger
*Attorney, Agent, or Firm*—Alan H. Levine

[57] ABSTRACT

A method of and apparatus for differential mode navigation in a sequential system of radio-navigation by phase reception. A transmitted amplitude-modulated radio-navigation carrier wave is phase or frequency modulated, this modulation being effected by a low-frequency subcarrier signal which is itself so phase modulated sequentially in accordance with phase corrections that each phase correction appears approximately simultaneously with the phase concerned. The phase corrections are derived from the difference between the phase received from each fixed station of the system and theoretical phases which should be received from that station. At a standard radionavigation receiver, the subcarrier signal modulated by the corrections is recovered, and the phase corrections are so applied to the received phases that each phase undergoes the phase correction received at the same instant.

18 Claims, 7 Drawing Figures

FIG. 2

TRANSMISSION OF RADIO NAVIGATION PHASE CORRECTIONS

BACKGROUND OF THE INVENTION

The invention concerns an aid to navigation in a sequential system of radionavigation by phase reception which is used in differential mode of operation, such as the system known under the name OMEGA, and which is envisaged for general application on a terrestrial scale.

It is known that the differential-mode use of a ratio-navigation system presumes supplementary transmission of phase corrections defined by the difference between each phase received at a selected site and the corresponding theoretical phase. The theoretical phase at a point is that which, in the theoretical network of position lines, satisfies a reciprocal and stationary correspondence with a geographical position of this point. The received phase varies complexly with time in relation to the theoretical phase, and this produces untimely errors in this reciprocal correspondence. It is therefore apparent that the knowledge of the corrections thus transmitted permits substantial reduction of these untimely errors.

This differential usage applies only in a certain zone close to the selected site. It is therefore desirable that the supplementary transmission should be extended to this zone, whatever type of receivers of the sequential radio-navigation system are to be found there.

For the same reason, a large number of supplementary transmissions of this kind lso need to be provided if the differential-mode radio-navigation system is desired for use over long distances. In particular, in coastal areas the supplementary phase-correction transmissions should be made in sufficient number to enable the differential-mode radio-navigation system to be used along all coast and thereby obtain the advantage of greater precision.

The radionavigation system receivers intended for additionally receiving this correction transmission can, for their part, range from the ordinary type to the highest degree of precision according to the application. Also it is clearly necessary for the same correction receiver to be usable over great distances for a full set of these supplementary transmissions and without involving the user in complicated operations. In other words, an intervening normalization is required over the set of supplementary phase correction transmissions.

Each correction transmitting station has therefore to allow general diffusion over a certain zone for receivers which range from the ordinary type to the greatest precision; more generally, a large number of such transmitting stations have to satisfy this criterion, while at the same time permitting a normalization of utilization and great precision.

In the case of the Omega system, for example, eight base transmitting stations are provided to cover all the globe, the distance between transmitting stations here being of the order of 8000 km (5000 miles).

According to present estimates, the utilization range of one correction transmitting station will at most be several hundred kilometres. It is therefore clear that a considerable number of correction transmitting stations is required.

Having regard to the present congestion of the ether, frequency allocations are becoming increasingly more difficult to obtain for differential radionavigation, even with technical requirements as fundamental as those which have just been presented.

In the future it seems unlikely that the allocation of new radio channels will be sufficient to solve this problem, for it will probably be necessary to install progressively more and more correction transmitting stations, and this will quickly saturate these new channels.

Moreover it is clear that most of the channels already occupied are not compatible with all the requirements set out above for the supplementary transmission of corrections, namely, diffusion over predetermined zones, great simplicity of utilization, normalization over a large number of different transmissions and high precision.

SUMMARY OF THE INVENTION

However the present invention contributes a particularly satisfying solution to the problem thus posed.

According to the invention, a method of aid to navigation is provided for use in differential mode in a sequential system of radionavigation by phase reception.

In transmission, an amplitude-modulated radiogoniometric carrier wave is modulated in phase or frequency by a multiplexed phase-correction signal having a low frequency and having a phase so related linearly and sequentially to the phase corrections that each phase correction appears approximately simultaneously with the corresponding phase.

With standard receivers of the sequential radio-navigation system, on reception the carrier wave is filtered and demodulated in order to recover the multiplexed correction signal, and then the phase corrections contained in this multiplexed correction signal are applied to the received phases so that each phase undergoes the phase correction received at the same moment.

Such an amplitude-modulated radiogoniometric carrier wave is in general emitted by a radio beacon. The transmissions of radio beacons are of different type according to the field of application.

Aeronautical radio beacons have transmissions in the frequency band from 315 to 405 kHz. Their transmission is repetitive and of type $A_1$, i.e. the pure carrier wave is "manipulated" for 5 seconds, that is to say, it is modulated on an all-or-nothing basis by an identification code (several letters in morse for example), and then transmission continues for 30 seconds.

Maritime radio beacons use the frequency band from 285 to 315 kHz.

Although certain maritime radio beacons operate with the $A_1$ type of transmission defined above, the great majority present transmissions of type $A_2$, i.e. the carrier is modulated in amplitude by a low-frequency signal of fixed value which is characteristic of the radio beacon in the same way as the manipulation. This manipulation applies for most of the time to the whole of the modulated signal, and not only the amplitude modulation.

The duration of a transmission sequence is typically about 1 minute with the following breakdown:
— repetition of the identification code modulated for 15 seconds,
— continuous transmission of the modulated wave for 40 seconds,
— repetition of the identification code and transition for 5 seconds.

Certain radio beacons have a permanent transmission, immediately resuming the cycle.

More frequently, however, the radio beacon belongs to a group of several stations, two or six for instance.

In this case the phase modulation operation defined above can be effected for a first radio beacon by a multiplexed phase-correction signal having at least one known multiplexing segment allotted to its reference phase, that is to say, in which its phase is fixed, and so does not depend linearly on phase corrections during this known segment.

In this case the successive phase corrections are introduced in relation to this reference phase; for example, for a zero phase correction the multiplexed signal will have its reference phase.

At another radio beacon of the group the carrier wave of the first radio beacon is received, demodulated and filtered in this known segment in order to extract the reference phase therefrom. Thereafter the same phase modulation operation is repeated, but on the wave of the second radio beacon, and with another multiplexed phase-correction signal, at the same low frequency, and adjusted to have the reference phase.

Under these conditions, as regards the receiver of the sequential system of radionavigation, the operations of reception and application of phase correction can then be performed on any of the carrier waves emanating successively from different radio beacons of the group.

Advantageously, the method also includes, in the reception of the corrections, narrowband low-frequency filtering of the correction signal or signals, the application of the phase corrections here being inhibited whenever the signal so filtered has an amplitude less than a selected value.

Preferably, the phase-correction operation allows for each phase to be corrected to have a self-hold time constant greater than 1 minute and, by preference, close on 10 minutes, and which is distinct from the time constant for establishing and applying the corrections, which is preferably shorter.

The invention also provides transmitting stations and correction receivers for applying the method of the invention.

BRIEF DESCRIPTION OF THE DRAWINGS

Other characteristics and advantages of the invention wll be seen on reading the detailed description which follows, with reference to the accompanying drawings which are given by way of non-restrictive example, and wherein.

DESCRIPTION OF THE PREFERRED EMBODIMENTS

In the course of the present detailed description it is assumed that the site selected, in relation to which the corrections transmitted on a carrier wave are defined, coincides approximately with the location of the radio beacon transmitting this carrier wave.

Figure 1:
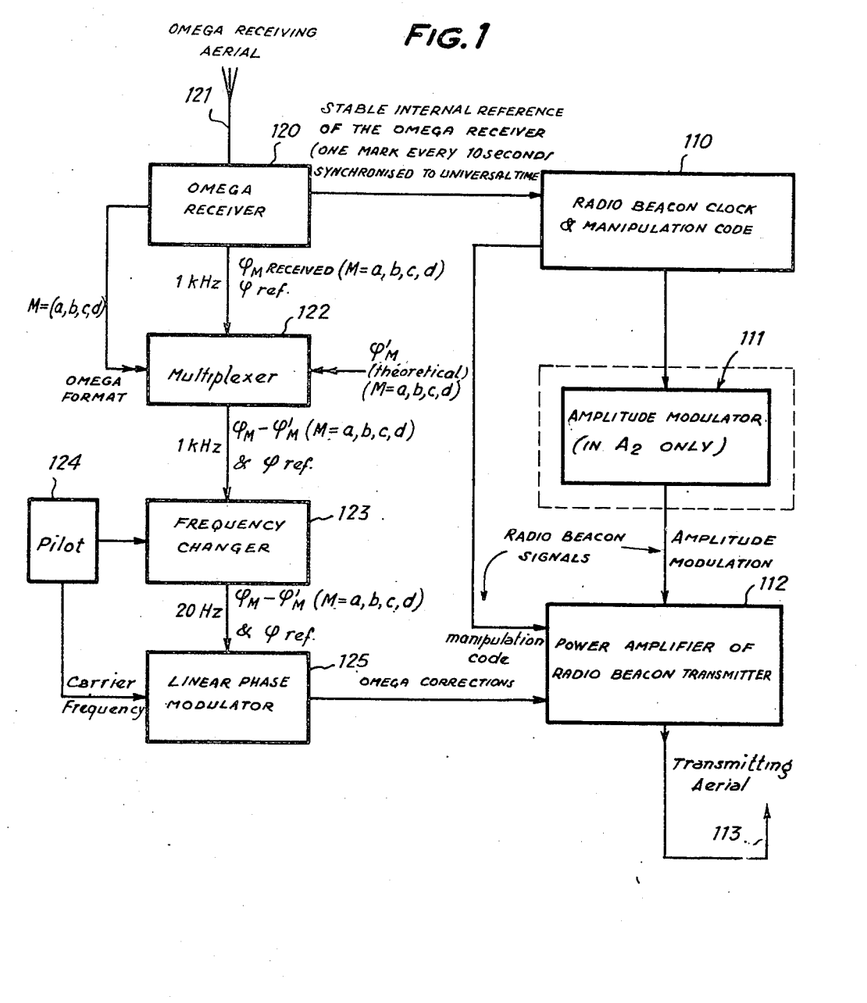
FIG. 1 illustrates the electric circuitry in an application of a method embodying the invention to a radio beacon transmitting a manipulated standing wave, with or without amplitude modulation.

The right-hand part of FIG. 1 illustrates the standard elements of an $A_1$ or $A_2$ standing-wave radio beacon used for radio location purposes.

Such stations contain a clock source 110, also arranged to supply the radio beacon manipulation code, in the form of logical states corresponding, for example, to letters in Morse code. These Morse code letters are intended to be intelligible to the ear of the user after detection of the radiogoniometric carrier wave. It will therefore be understood that the order of magnitude of the Morse code dash and dot times is between one-tenth of a second and 1 second.

This manipulation code is directly transmitted as an all-or-nothing modulation instruction to a circuit 112 which is the power amplifier of the radio beacon transmitter.

In the case where the radio beacon contains linear amplitude modulation, which corresponds to the $A_2$ type, the radio beacon additionally contains a circuit 111 which is closed by a broken line to represent the fact that it is optional. This circuit 111 produces from the clock source 110 a sinusoidal signal at selected frequency in the range 300–1000 Hz.

The output of this circuit is applied as an amplitude modulation instruction to the power amplifier 112. It is, of course, clear that this power amplifier will differ slightly according as the carrier wave is or is not sinusoidally modulated in amplitude.

In a standard radio beacon the power amplifier 112 directly receives the output of a pilot frequency source (not shown) as the signal to be amplified. In accordance with the invention, the radio beacon also contains a receiver 120 of the Omega radionavigation system with its serial 121.

This receiver is advantageously of the type which gives the highest performance, i.e. it contains a local oscillator which is synchronized to the universal time as defined by the collection of base transmitting stations of the Omega system. Such a receiver notably permits circular-mode radionavigation in relation to a single base transmitting station of the Omega system.

However, in the present case, the receiver is fixed. Hence it will simply give a reference phase on a 1 kHz signal synchronized to the universal time, and the received phases relating to four of the base transmitting stations designated in general by the subscript M and individually by the letters $a$, $b$, $c$ and $d$. These received phases are expressed on the 1 kHz signal in relation to the reference phase.

In this drawing the phases are designated by the Greek letter $\phi$ (small phi). This letter has the subscript M (which can assume one of the values $a$, $b$, $c$ or $d$) whenever it relates to radionavigation system waves arriving from stations having these subscripts; the subscript "ref" is applied whenever it relates to the reference phase.

All these phases, supplied individually in the form of 1 kHz signals by the Omega receiver 120, are applied to a multiplexer 122. The receiver 120 also supplies this multiplexer with signals of Omega format which locally define the time intervals in which the stations $a, b, c$ and $d$ respectively transmit base frequency waves to give the received phases $\phi_M$ ($M = a, b, c, d$) in the receiver 120.

By other means the multiplexer 122 receives phases $\phi_M'$ (phi primed) which are the theoretical phases for the base frequency and the transmitting stations $a, b, c$ and $d$ respectively of the Omega system.

The output of the multiplexer 122 is therefore a multiplexed signal at the frequency of 1 kHz; in accordance with the Omega format, its phase is linearly related to the difference between the phases $\phi_M$ which are received by the receiver 120 and the theoretical phases $\phi_M'$ which are introduced into the multiplexer 122 successively for the transmitting stations $M = a, b, c$ and $d$.

Since the Omega system contains altogether eight base transmitting stations and only four are the object of a correction transmission (the others are often hardly perceptible at the site itself), several segments of the Omega format therefore remain available for the reference phase to be passed to the multiplexer 122. One of these free segments, called the reference segment, is allowed to be used for this purpose.

The multiplexed signal from the multiplexer 122 is thereupon applied to a frequency-change circuit 123 which receives a heterodyne frequency to lower the frequency of this multiplexed signal to 20 Hz. The resulting 20 Hz signal so obtained is thus a low-frequency multiplexed phase-correction signal with a phase linearly related successively to the phase corrections.

Figure 3:
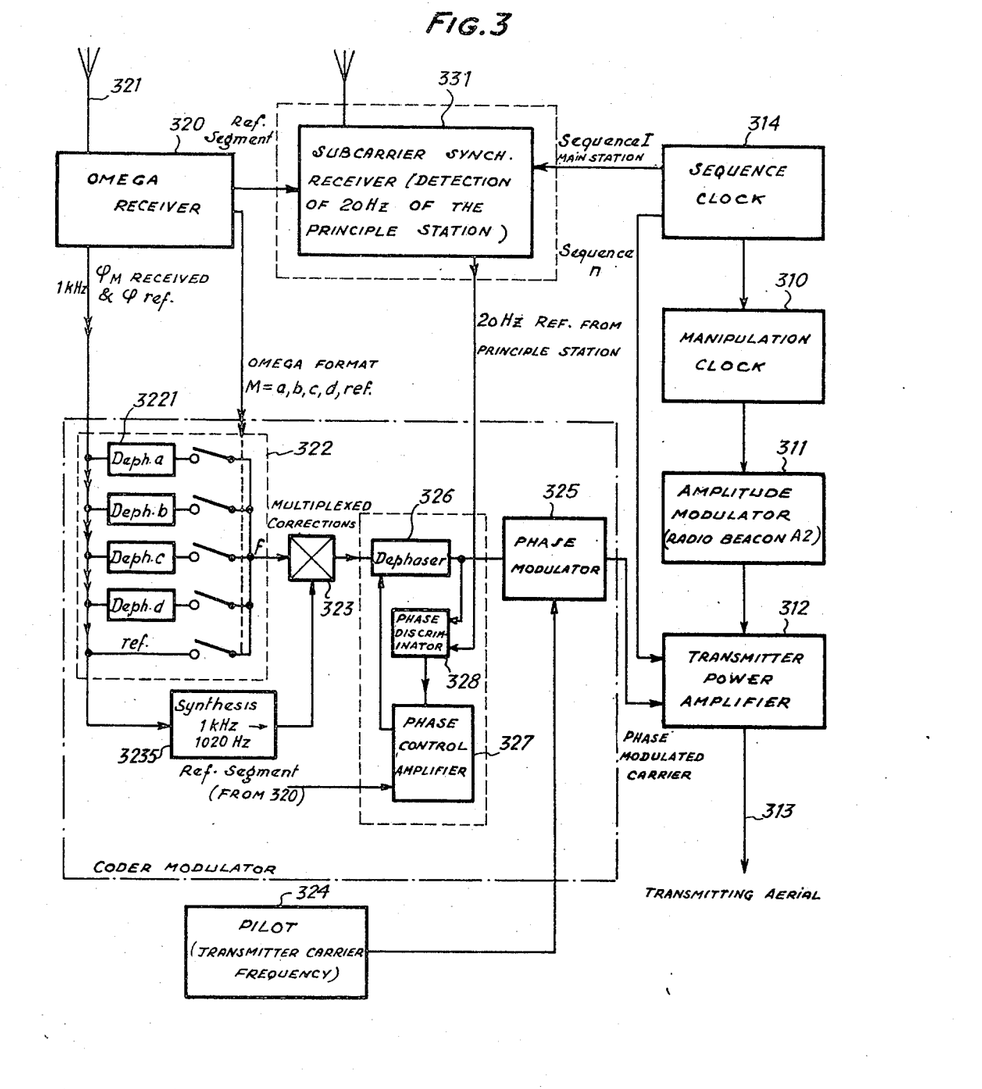
FIG. 3 illustrates the electric circuitry of a slave radio beacon embodying the invention in a sequential group such as that in FIG. 2.

The heterodyne frequency which can be at 980 or 1020 Hz, is supplied by a pilot frequency source 124 or, better still, from the Omega receiver itself, as will be seen from FIG. 3.

The pilot frequency source 124 by other means supplies the radio beacon carrier frequency which is applied to the linear phase modulator 125 that receives the multiplexed signal at 20 Hz as a phase modulation input.

The output of the phase modulator 125 is applied as a signal to be amplified to the power amplifier 112 of the radio beacon transmitter which is itself coupled to an aerial 113.

Thus the aerial 113 radiates a carrier wave which is modulated in amplitude possibly in an all-or-nothing mode by a Morse alphabet manipulation and possibly by a linear amplitude modulation according to a sinusoidal frequency. This amplitude modulation defines the identity of the radio beacon. In accordance with the invention, this carrier wave is also modulated in phase by the 20 Hz multiplexed phase-correction signal with a modulation index preferably less than or equal to 0.6. This 20 Hz signal can be regarded as a sub-carrier, itself modulated in phase in multiplexed fashion.

More detailed examples of the embodiment of the circuits of FIG. 1 of the present patent application appear in U.S. Pat. No. 3,774,211.

The receiver 120 of the present device can be the receiver 1 of FIG. 1 of the above patent; the multiplexer 122 contains the circuits 21 and 22 of the above patent, and the frequency-change circuit 123 includes the circuit 23 and 24 of the above patent. Finally, a simple example of the linear phase modulator 125 is constituted by the circuit 25 appearing in FIGS. 1 and 3 of the above patent.

In addition to this, in FIG. 1 of the present patent application the clock 110 is synchronized from the stable internal reference of the Omega receiver 120, which is itself synchronized to the universal time defined by the base Omega transmitting stations. This synchronization is effected every 10 seconds in the form of a 'mark'.

This enables the radio beacon manipulation code to be best set in relation to the sequence of base transmissions of the Omega system.

Figure 2:
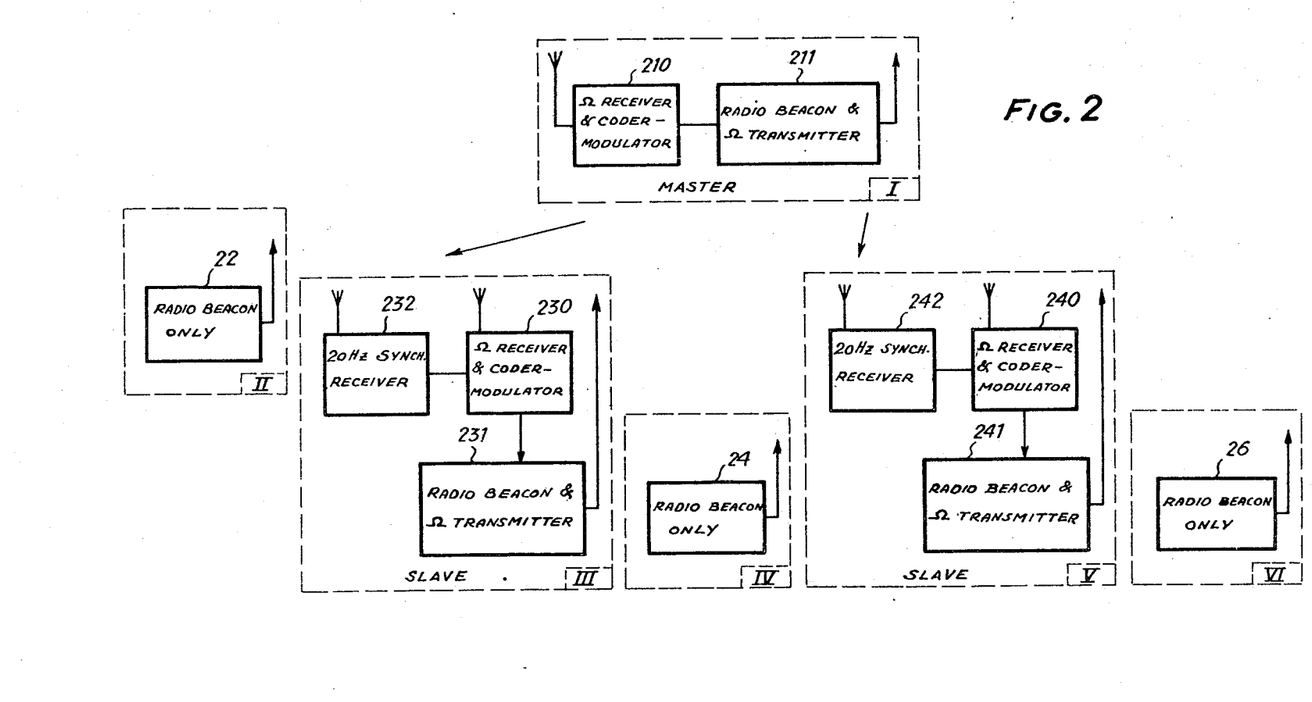
FIG. 2 illustrates generally an application of the method to $A_2$ waves transmitted sequentially by six radio beacons respectively, of which two slave stations are so synchronized in relation to a master station that these three stations can sequentially send "Differential Omega" corrections at the same carrier frequency.

FIG. 2 shows a group of six radio beacon transmitting stations numbered in Roman numerals I to VI.

Normally, these stations sequentially transmit a carrier wave at the same frequency with amplitude modulation of type $A_2$. In accordance with the invention, one of the stations, say station I, is constructed in the manner shown in FIG. 1, except that it additionally contains a sequence clock which enables it to transmit in its turn. The part of this station which corresponds to the left of FIG. 1 and which can be called the "Omega receiver and coder-modulator", is designated as 210. Here the circuit 211 represents the part of this station which corresponds to the right-hand side of FIG. 1, together with the sequence clock. This part can be called the radio beacon and Omega transmitting station. This station acts as a "Master" since it defines the general reference for the phase of the 20 Hz signal for the other stations of the group. This reference phase of the 20 Hz signal is in fact produced in circuit 210.

The stations II, IV and VI contain radio beacon transmitters only, designated as 22, 24 and 26 respectively.

The stations III and V, like station I, contain an Omega receiver and coder-modulator 230 and 240 respectively, as well as a radio beacon and Omega transmitter 231 or 241 respectively. In addition to this, they contain a receiver 232 or 242 respectively for synchronization to the reference phase of the 20 Hz sub-carrier signal.

The station I therefore plays the role of Master, and it can be identical to the station of FIG. 1, except for the "frequency clock" circuit which is additionally present and is also to be found in the slave stations. The slave stations III and V are slightly more complicated, and so station III will now be described with reference to FIG. 3.

On the extreme right-hand side FIG. 3 contains the circuits 310, 311 and 312 and an aerial 313 which are analogous to the circuits 110 to 113 in FIG. 1.

Although the connections are not shown, the manipulation clock 310 is synchronized from an Omega receiver 320.

This synchronization is preferably effected via the sequence clock 314 which receives a mark every 10 seconds in universal time from the Omega receiver 320 along a line which is also not shown. The sequence clock 314 defines the minute of universal time devoted to the relevant transmitting station and it influences the power amplifier 312 similarly to the manipulation clock 310 for all-or-nothing control of transmission.

The Omega receiver 320 can be identical to the receiver numbered 120 in FIG. 1.

The multiplexer 322 corresponds to the multiplexer 122, but more details are shown since the dephasers such as 3221 which respond to the theoretical phases, are indicated. Likewise the multiplex switches are shown, these being controlled by Omega format signals (M = 1, b, c, d, ref).

The frequency-changer 323 in FIG. 3 receives the output signal of a synthesis circuit 3235 to produce a 1020 Hz frequency from the 1000 Hz frequency arriving along the reference path from the Omega receiver 320.

The output of the frequency-changer 323 is applied to the phase modulator 325 via a dephaser 326. This phase modulator receives the station carrier frequency from a pilot frequency source 324.

In FIG. 3 are shown some circuits within boxes drawn by dashed lines. These circuits are present in the slave stations, but not in the master station. In other words, the electric circuitry of the master station is obtainable by eliminating from FIG. 3 those parts which are closed by the short dashes. In this case, one must of course reconstitute a direct connection between the mixer 323 and the phase modulator 325.

In a slave station the circuit 331 is the subcarrier synchronization receiver. It receives the multiplexed phase-correction signal like any ordinary correction-receiver, for example, the one which is described later with regard to FIG. 6. However it only supplies output signals during the reference segment defined above and provided by the Omega receiver 320. The output of the synchronization receiver 331 is therefore constituted during the reference segment by a pure 20 Hz frequency with approximately the reference phase of the 20 Hz subcarrier signal used in the master station.

The dephaser 326 is of phase-shift memory type. Its phase-shift instruction is effected by a phase control amplifier 327 which responds to its phase difference input only during the reference segment which is applied to it as an inhibit instruction.

The phase difference input of the amplifier 327 is received from a phase discriminator 328 which compares the phase coming from the receiver 331 with the phase which exists at the output of the dephaser 326. It will be recalled that these two signals are at the frequency of 20 Hz, and during the reference segment the phase at the output of the dephaser 326 is the reference phase of the Omega receiver 320 of the slave station III, which can differ from that of the Omega receiver corresponding to the master station I, this latter reference phase appearing just at the output of the receiver 331.

Thus the phase discriminator 328 will apply the difference between these two reference phases to the control amplifier 327 which controls the dephaser 326 to nullify this difference.

In this way the phases of the 20 Hz signals tend to be equalized for the radio beacons I, III and V. In effect, the reference phases will be the same and, of course, the slope factor of the linear function relating the phase corrections to the phase of the multiplexed correction signal will be the same for all these stations.

Moreover the Omega receivers such as 320 in the radio beacons have pilot-frequency sources of very high quality, and so the phase deviation of the 20 Hz frequency between two receivers of this kind is small. Hence the control action constituted by the circuits 326 and 328 during the reference segment will not have to be very strong to compensate for this phase deviation.

Various means of reception of "Differential Omega" phase corrections and of application of these corrections in a base Omega receiver will now be described.

For greater clarity, in FIGS. 4, 6 and 7 a horizontal chain-dotted line has been drawn to separate the Omega receiver from the correction receiver, the Omega receiver being below the line. The separation cannot however be total, in fact, since the corrections provided by the correction receiver are applied to the received phases obtained in the Omega receiver.

Figure 4:
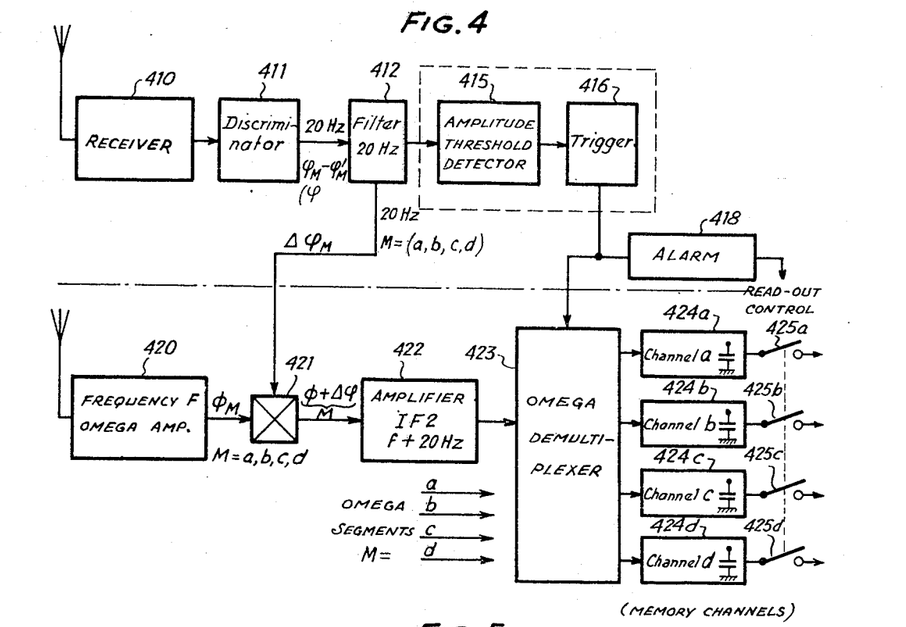
FIG. 4 illustrates the electric circuitry of a first type of receiver for implementing the method of the invention.

In FIG. 4 the reception and application of the phase corrections are of a first type, according to which the multiplexed phase-correction signal is regenerated in the correction receiver and directly applied without demultiplexing to the signal derived in the Omega receiver for waves received at the base frequency of the radionavigation system. This is made possible by the fact that the format of the multiplexed phase-correction signals at the 20 Hz subcarrier frequency is the same as the transmission format of the Omega system at the base frequency.

More precisely, FIG. 4 contains a receiver stage 410 for reception and filtering of the carrier wave, changing its frequency and amplifying it. The output of the reception stage 410 is applied to the phase discriminator 411. The output of this discriminator 411 is the multiplexed phase-correction signal at 20 Hz which contains the phase corrections $\Delta\phi_M = \phi_M' - \phi_M$ for four base transmitting stations for which M = a, b, c and d. This signal also contains the reference phase $\phi_{ref}$ which can be used for circular-mode radionavigation, as described with reference to FIG. 3, and which will not be considered in the following description of the receivers.

The corrections are then applied to a 20 Hz filter which has two separate identical outputs for reasons of adaptation which experts will understand.

The Omega receiver of FIG. 4 contains a low-frequency amplifier 420 with filtering and, possibly, a frequency change.

The output of this amplifier 420 is therefore a signal of frequency $f$ having phases $\phi_M$, where sequentially M = a, b, c, d. This signal is illustrated as a function of time by the line L1 in FIG. 5.

Figure 5:
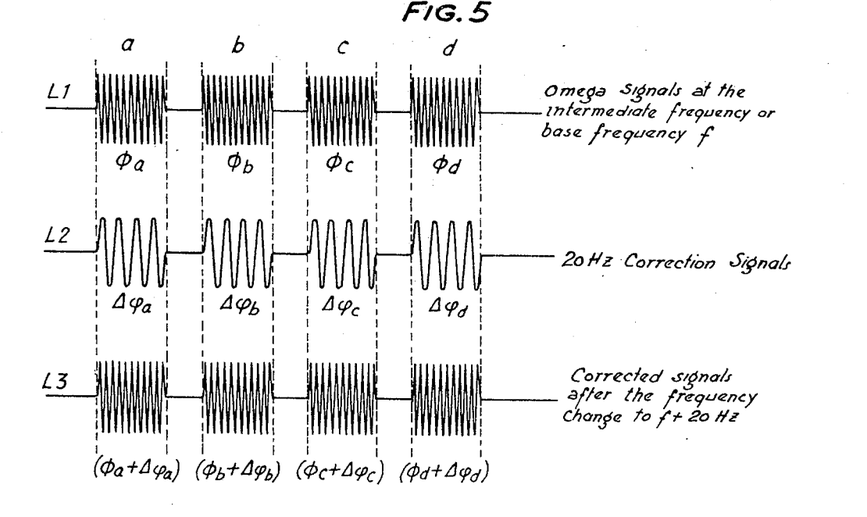
FIG. 5 is a timing diagram illustrating waveforms at different points of the receiver of FIG. 4.

The line L2 of FIG. 5 shows the output signal of the filter 412, with the exception of the reference phase.

These two signals are mixed in a frequency-change circuit 421, the output of which is represented by the line L3 in FIG. 5. The frequency produced is $f + 20$ Hz, and the phase is equal to the sum total of each received phase $\phi_M$ represented by line L1 and of each corresponding phase correction $\Delta\phi_M$ represented by the line L2.

The corrected phases so obtained are applied to an amplifier 422 at the intermediate frequency $f + 20$ Hz, followed by the demultiplexer 423 supplying four channels 424a to 424d.

These four channels 424 deduce the phase data from the demultiplexed corrected signals.

In each channel 424 a capacitor has been shown in order to illustrate the fact that these channels possess a memory function, i.e. a large self-hold time constant.

This time constant is advantageously greater than 1 minute, and preferably close on 10 minutes.

By other means, the second output of filter 412 is coupled to a circuit 415 which is an amplitude threshold detector, which produces an output signal whenever the amplitude of the multiplexed phase-correction signal, or 20 Hz subcarrier, becomes less than a selected value. Its output is connected to a trip or trigger which in this case simultaneously controls the demultiplexer 423 and an alarm circuit 418 which is itself coupled to a read-out permissive circuit, the read-out being performed by the intermediary of switches 425a to 425d which are placed downstream from the channels 424.

Thus, when the 20 Hz signal becomes insufficient in amplitude, the demultiplexing is inhibited, and the read-out is forbidden, signifying that the switches upstream from channels 424 (not shown, but included in the demultiplexer 423) and downstream from channels 424 (switches 425) remain open.

In consequence these channels exercise their memory function without upstream perturbation by false data, and without any downstream withdrawal for read-out altering their constant.

This is an important characteristic of the device, for the detector 415 goes to perform its function at every disappearance of the carrier wave, whether this may be by reason of the manipulation, or because of the sequential functioning whenever it is a question of a group of radio beacons such as the group in FIG. 2.

Some more detailed form of certain circuits of the present FIG. 4 are described with reference to FIG. 5 in the abovementioned patent. In particular, the present receiver 410 corresponds to the elements 51, 52, 53, 521 and 531 of the cited patent, but with the values of the intermediate frequencies here being adjusted for correspondence with the frequency band of the radio beacons. Similarly, the discriminator 411 and the filter 412 correspond to the elements 541 and 542 of the cited patent.

Figure 6:
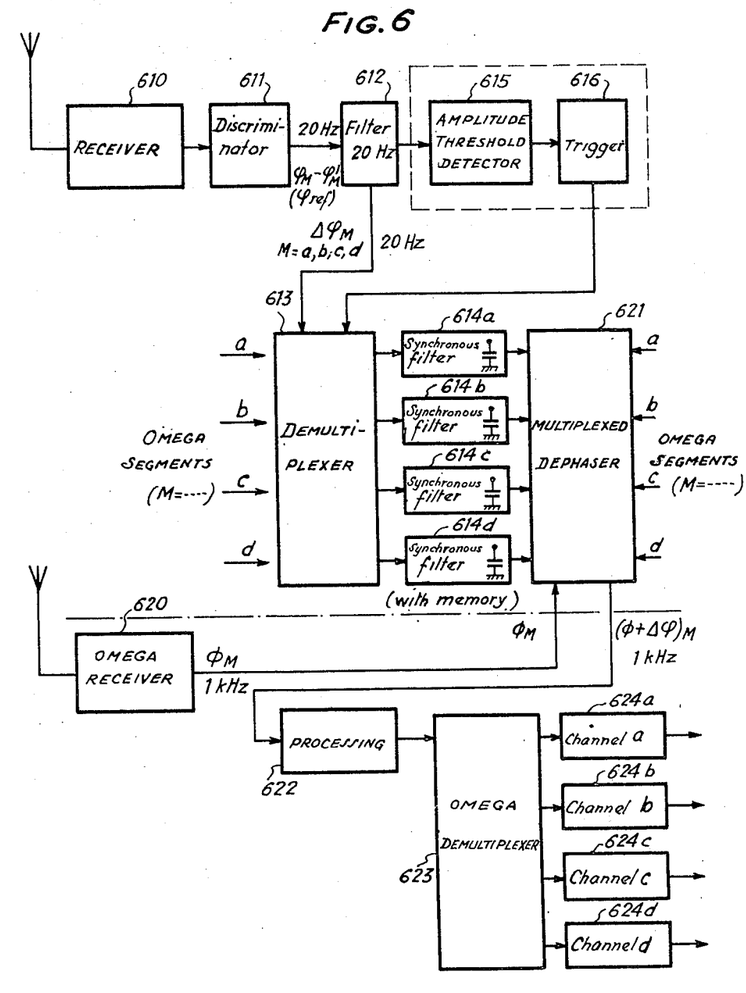
FIG. 6 illustrates the electric circuitry of a second type of receiver for implementing the method of the invention.
Figure 7:
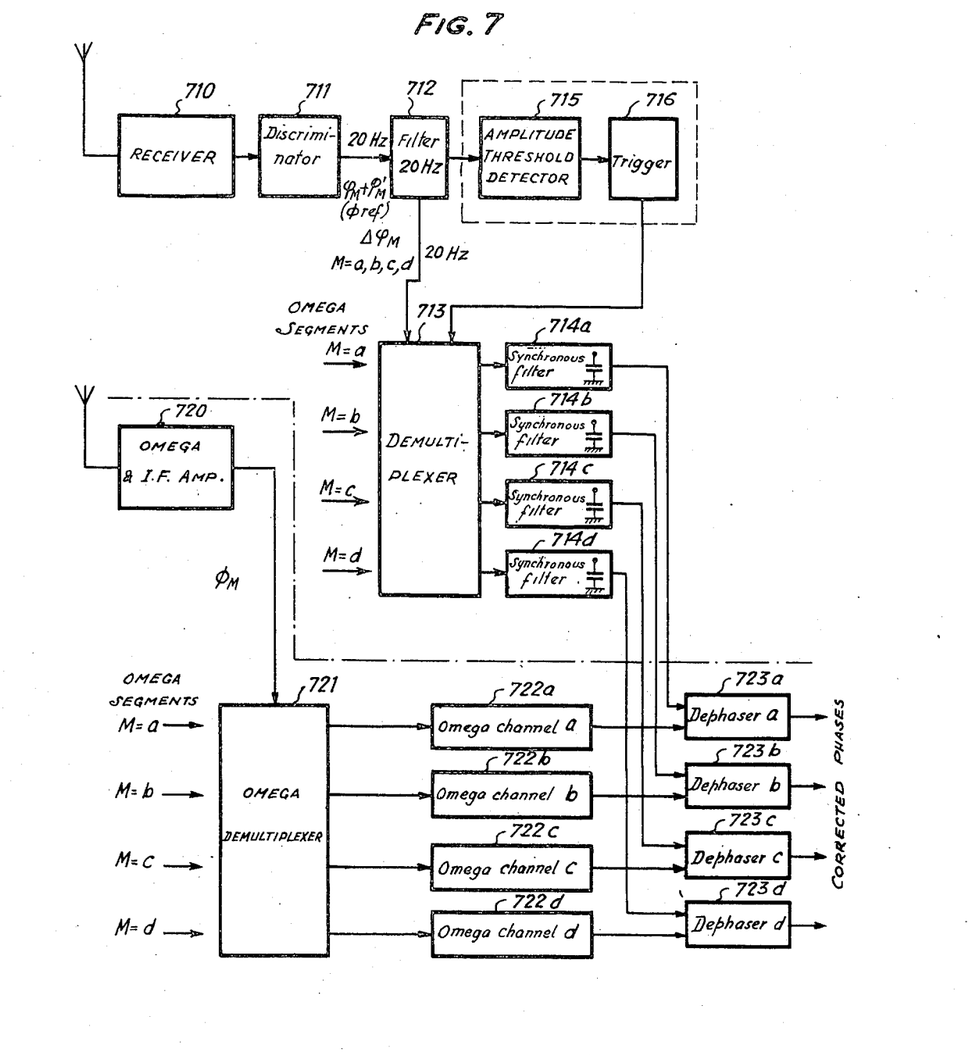
FIG. 7 illustrates the electric circuitry of a third type of receiver for implementing the method of the invention.

In the other two types of receiver shown in FIGS. 6 and 7 the phase-correction data are converted into analogue form before being applied to the received phases. In the receiver of FIG. 6 the received-phase signals are dephased before multiplexing in accordance with the analogue phase-correction data. In the receiver of FIG. 7 the phase-correction data are individually added to the received-phase data, converted into a convenient form for use.

FIGS. 6 and 7 otherwise have in common the elements shown at the top of these figures, namely the correction receiver, discriminator, 20 Hz filter, amplitude threshold detector and trigger. These elements correspond otherwise to those in FIG. 4, and they have the same reference number, except for the digit representing the hundreds, which stands for the number of the figure in each instance.

In FIG. 6 the 20 Hz multiplexed phase-correction signal is applied to a demultiplexer 613 which receives the Omega format signals as a multiplexing instruction. The demultiplexer 613 is inhibited by the output of trigger 616 whenever the multiplexed signal amplitude passes below the threshold.

The outputs of the demultiplexer 613 are applied to a plurality of synchronous filters 614a to 614d. Each of these synchronous filters contains a narrowband filter and a synchronous demodulator at 20 Hz which is controlled during the phase correction of the multiplexing segment to which it is allotted.

Such elements further contain a capacitor in their output stage, and so they are capable of the memory function with a time constant of the same order as that described with reference to FIG. 4. In actual fact, they also very often contain a veritable "phase memory".

In FIG. 6 the Omega receiver supplies, for instance, received phases $\phi_M$ which are carried by a frequency of 1 kHz. These phases are multiplexed due to the fact that they are received at the same base frequency of the Omega system. They are applied to a multiplexed dephaser 621 which by other means receives the Omega segments and the synchronous phase-corrections 614 for application of each phase correction during the corresponding segment.

The output of the multiplexed dephaser 621 therefore transmits signals which are at the frequency of 1 kHz and are corrected in phase. These signals are applied to a processing circuit 622, followed by a demultiplexer 623 and the channels 624a to 624d, these being standard circuits in an Omega receiver such as the one sold with the commerical designation "NRNX 1A" or "M2A" by S E R C E L.

Each synchronous filter 614 can contain the elements 55 which are described by reference to FIG. 6 in the above-mentioned patent, having regard to the fact that these elements also embody the demultiplexing function of the circuit 613 of the present device.

The multiplexed dephaser 621 contains, for example, a fast-response dephaser, the phase shift instruction of which is multiplexed along the paths $a, b, c, d$.

For the third type of receiver, FIG. 7 contains some elements which are analogous to those of FIG. 6, namely, the demultiplexer 713 and the synchronous filters 714a to 714d.

The Omega reception part of FIG. 7 contains a receiver circuit 727 with amplification, filtering and frequency-changing, followed by a demultiplexer 721, then by channels 722a to 722d in order to obtain received-phase data in a form which can be used directly.

In the type of receiver of FIG. 7 the phase-correction data coming from the channels 714 is combined with the received-phase data arriving from the channels 722 in the dephasers 723a to 723d. If the received phases from the channels 722 are carried by a frequency of 1 kHz, then the circuits 723 are effective dephasers for this frequency.

If the received phases as well as the phase corrections are in analogue form, the circuits 723 can be analogue subtractors.

Clearly, in the embodiments illustrated in FIGS. 6 and 7 the action of the amplitude threshold detector and of the trigger is very important in enabling the memory function of the synchronous filters to play its role whenever the carrier wave vanishes because of manipulation or, more particularly, because of sequential operation. The difference vis-a-vis FIG. 4 resides in the fact that the read-out can be permanent in the receivers of FIGS. 6 and 7, the frequency controls contained in the narrowband synchronous filters here having a phase memory.

Experiments performed by the Applicant have shown that goniometric use of the carrier wave phase modulated by phase corrections in accordance with the invention is not affected by this phase modulation. This is true equally as well when the radiogoniometry is carried out with a moving-coil receiver as when with more complicated receivers using a comparison between the wave received by a whip aerial "of reference" and the wave received by fixed crossed loops.

However, the phase modulation can have a slight influence on the intelligibility of the indentification signals of certain types of radio beacons.

In particular, in aeronautical radio beacons with $A_1$ type modulation the receivers generally use a beat frequency oscillator (B.F.0.) and the manipulation becomes evident by detection of the beat signal. In this case the effect of phase modulation in accordance with the invention will be perceptible in the form of a slight "vibrato" which cannot nevertheless seriously affect the intelligibility of manipulated identification signals.

The studies and experiments of the Applicant relate especially to the possible influence of the modulation and manipulation characteristics necessary for operation of the radio beacon on the satisfactory functioning of Differential Omega correction receivers embodying the invention.

Standard use of limiters upstream from the phase discriminator and careful filtering in the reception stages, properly speaking, already has the effect of sufficiently attenuating linear amplitude modulation whenever it exists.

In the event of intermodulations their effect on the correction carrier signals is further limited by reason of very effective filtering of the multiplexed correction signal at 20 Hz and also in the subsequent synchronous demodulators, at least for the receivers of FIGS. 6 and 7.

As regards the all-or-nothing modulation due to the manipulation, the first experiments of the Applicant have shown that it has practically no perceptible effect on the transmission of Differential Omega corrections embodying the invention.

By contrast, the Applicant has paid particular attention to defects which can be caused by periodical interruption of transmission when only some of the radio beacons of a group are equipped for Differential Omega transmission, as is the case in FIG. 2. It will be considered that the time allotted to each station is 1 minute, the period, or overall sequence time, here being 6 minutes.

Under the conditions the best result which may be obtainable during the "silences" of the transmission consists in keeping intact the correction values obtained during the most recent transmission in order to apply them throughout the interruption period due to these silences.

In fact, however, the correction values which should be applied, can vary significantly, whereas it is a constant value which is preserved.

The following Table gives some values observed by the Applicant for phase root-mean-square errors expressed as a percentage in turn for standing transmission or for various cases of sequential transmission.

The first row of the Table relates to approximate values associated only with the mode of transmission of the corrections in accordance with he invention, whilst the second row concerns the total error, allowing for the fact that the corrections obtained at the selected site are not completely with the corrections which should be made in all the zone where they are applied. The root-mean-square error due to this decorrelation is generally evaluated to be about 1.5 percent when the distance from the correction transmitting station to the user is 300 km.

The third row of the Table represents the degradation coefficient referred to sequential operation. There is a slight degradation in standing transimssion due to the fact that the transmission is never perfect.

|  | Standing transmission | Sequential 1' on 2' | Sequential, period 3' 1' on 3' |
| --- | --- | --- | --- |
| Root-mean-square deviation | 0.216 | 1.04 | 2.15 |
| Root-mean-square error | 1.51 | 1.83 | 2.62 |
| Degradation coefficient | 1.01 | 1.22 | 1.74 |

It appears that standing transmission of Differential Omega corrections permits a 1:5 improvement in accuracy compared with the tabulated corrections defined by the American organization U.S. Naval Oceanographic Office. It is therefore clear that the values given in the above Table for the two sequential modes of operation correspond also to distinctly better results than the tabulated corrections mentioned.

This holds good for a range of 300 km from the selected site; beyond this range, it is preferable to use another correction transmitting station or to revert to the tabulated corrections.

For this purpose it is advantageous to use, jointly with a method embodying the present invention, the method described in the French Patent entitled "Dispositif de correction de phase, notamment pour un récepteur de radionavigation Oméga" (Phase correction device, notably for an Omega radio-navigation receiver). A certified copy of this French application and a certifed English translation thereof are in the file of this application. The two means can be used alternately, the corrections arriving from one or the other, or simultaneously, in which case the corrections originating from the two means are then applied by two dephasers mounted in series to the phases received by the base Omega receiver.

In this latter case, the correction device of the last-mentioned patent publication is not used for memory-storage of the U.S.N.O.O. tabulated corrections directly, but to contain differential values. These differential values are obtained by deducting the tabulated values relating to the site selected for measuring the Differential Omega corrections transmitted and used, from the values of the U.S.N.O.O. tabulated corrections for the location of the receiver.

What is claime is:

1. A method of transmitting information to mobile receivers, comprising:
— sequentially transmitting phase information from at least two fixed stations of a sequential radio-navigation system;
— receiving at a fixed radio-beacon station said phase information according to a multiplex sequence corresponding to the sequence of transmission of the sequential radio-navigation system, and deriving a phase correction signal linearly related to the difference between the phase received from each fixed station and theoretical phases which should be received from each fixed station, said phase correction signal being also time-multiplexed according to the same said sequence of transmission from the radio-navigation system so that a given phase correction signal is produced approximately simultaneously with the phase information which should be corrected by this correction signal;
— transmitting from said radio-beacon station an amplitude modulated signal for conventional local direction finding, said signal being also phase modulated according to the multiplexed sequence of phase correction signals;
— receiving at a mobile receiver said phase information from the fixed stations of the radio-navigation system and receiving also from the fixed radio-beacon station the amplitude modulated signal for conventional local direction finding and phase modulated for phase corrections of the received phase information;
— filtering and demodulating said signal from the radio-beacon to recover the multiplexed phase correction signal, and applying phase corrections to the received phase information from the fixed stations so that each phase information is modified by the phase correction which is received at the same instant of the multiplexed sequence as said phase information.

2. A method in accordance with claim 1, in which the said signal from the radio-beacon is interrupted, and another amplitude modulated signal for conventional local direction finding is thereupon transmitted at the same frequency as the first mentioned one from another radio-beacon, said method comprising also:
— phase modulating the first mentioned radio-beacon signal according to phase corrections derived at said first mentioned radiobeacon, and according to a multiplexed sequence having at least one known multiplexing segment allotted to transmission of a reference phase of said radio-beacon;
— receiving at the other radio-beacon, the phase information from the fixed radio-navigation stations, deriving a phase correction signal multiplexed according to the said sequence of transmission, and receiving also the signal from the first radio-beacon;
— demodulating and filtering at the other radio-beacon said signal from the first radio-beacon during the said known segment to extract therefrom the reference phase of the first radio-beacon;
— phase modulating the amplitude modulated signal of the second radio-beacon according to a phase correction signal derived at said second radio-beacon in a similar manner as in the first radio-beacon, said phase modulation signal of the second radio-beacon being made with respect to said reference phase recovered at the second radio-beacon;
— receiving, demodulating and filtering at the mobile receiver the signal received from the second radio-beacon station, and applying corrections retrieved from this signal.

3. A method in accordance with claim 1, wherein the reception operation at a mobile receiver also includes narrowband filtering of the low frequency at the correction signal, the said application of the phase corrections being inhibited whenever the amplitude of the signal thus filtered is less than a selected value.

4. A method in accordance with claim 1, wherein the phase-correction is applied to the received phase information at the mobile receiver with a time constant greater than 1 minute.

5. A method in accordane with claim 4, wherein the application of the said phase corrections consists in heterodyning a signal derived from the received phases of the sequential radionavigation system with the said multiplexed correction signal, the said time constant being applied to the phases then obtained after demultiplexing.

6. A method in accordance with claim 4, wherein the application of phase corrections consists in demultiplexing the correction signal according to the format determined locally for the phases of the sequential radionavigation system, the said time constant being applied to each demultiplexed phase correction in corresponding synchronous filters, and in shifting, in accordance with the phase corrections arriving from the synchronous filters, and in accordance with a multiplexing corresponding to the determined format, the phase of a signal derived from the received phases of the sequential radionavigation system in multiplexed fashion as laid down in the local format.

7. A method in accordance with claim 4, wherein the application of phase corrections consists in demultiplexing the correction signal according to the format determined locally for the phases of the sequential system of radionavigation, the said time constant being applied to each demultiplexed phase correction in a corresponding synchronous filter, in separately demultiplexing the signal derived from the received phases of the sequential system of radionavigation, and in individually applying the phase corrections to the corresponding phases thus demultiplexed.

8. A radio-beacon system comprising a first radio-beacon station adapted to transmit a signal which is amplitude modulated for conventional direction finding, said radio-beacon including:
  a radiofrequency power amplifier coupled to a transmitting aerial for effecting amplitude modulation of a carrier wave in an all-or-nothing mode as instructed by an identification-code generator circuit;
  a receiver for the phase information transmitted from a sequential radionavigation system supplying received phases, and a sequence format;
  means for producing phase corrections from these received phases and from prescribed theoretical phases respectively;
  means for producing a low-frequency multiplexed signal having a phase which is so related linearly and in succession to phase correction in accordance with the said sequence format that each phase correction appears approximately simultaneously with the phase to which the correction applies; and
  means for phase modulation of the carrier wave by this multiplexed phase-correction signal, the phase modulated carier wave being applied to the radiofrequency amplifier, and then thereby being transmitted after having further undergone an amplitude modulation.

9. A radio-beacon system in accordance with claim 8, wherein the receiver of the sequential radionavigation system is equipped to supply to the identification-code generator circuit a synchronization signal which is related in time to the sequence format.

10. A radio-beacon system in accordance with claim 8, wherein in the said first radio-beacon station the means for producing the multiplexed low-frequency signal is responsive to a known segment of the sequence format to start multiplexing and wherein said radiofrequency power amplifier is adapted to transmit an amplitude modulated carrier wave with a reference phase during said known segment.

11. A radio-beacon system in accordance with claim 10, containing at least one other similar radio-beacon station, each radio-beacon station of the system additionally containing a sequence clock so influencing the power amplifier as to transmit the carrier wave of each radio-beacon successively, wherein the other radio-beacon station also contains:

- a receiver for receiving the phase information of the sequential radionavigation system supplying received phases, and a sequence format,
- means for producing phase corrections from these received phases and from prescribed theoretical phases respectively,
- means for producing a low-frequency multiplexed signal having a phase so related linearly and in succession to the phase corrections, according to the said sequence format, that each phase correction appears approximately simultaneously with the phase to which the correction applies, and
- means for phase modulation of the carrier wave by this multiplexed phase-correction signal, the phase modulated carrier wave being applied to the radio-frequency amplifier, and thereby being transmitted after having further undergone an amplitude modulation,
- means responsive to the sequence clock for selective reception and demodulation of the low-frequency multiplexed signal arriving from the first radio-beacon station during the known segment, in order to extract therefrom the reference of the said first radio-beacon station, and
- means for phase shifting the low-frequency multiplexed signal of the other transmitting station in accordance with the deviation between the reference phase of the first transmitting station and the local reference phase of the carrier wave during the known segment.

12. A correction receiver for use with a receiver of a sequential radionavigation system, comprising:
- means for reception, filtering and demodulation of the signal transmitted by a radio-beacon station amplitude modulated for conventional direction finding and in phase according to a multiplexed phase-correction signal, such means providing a demodulated multiplexed correction signal,
- means to apply the said correction signal to the received phase in such a way that each phase undergoes the phase correction received at the same instant,
- means for separately rectifying the said multiplexed correction signal, and
- means for inhibiting the application of corrections when the rectified amplitude of the multiplexed correction signal is less than a preselected value.

13. A correction receiver in accordance with claim 12, wherein the means for application of the phase corrections has a time constant greater than 1 minute.

14. A correction receiver in accordance with claim 12, wherein the means for application of the phase corrections contains a mixer which mixes the signal derived from the received phases of the sequential radionavigation system with the multiplexed correction signal, a demultiplexer and means for then recovering the individual received phases with the said time constant.

15. A correction receiver in accordance with claim 12, wherein the means for application of the phase corrections contains a correction-signal demultiplexer, followed by a plurality of synchronous filters with the time constant precited for the individual phase corrections, and also a multiplexed dephaser for sequential phase shifts, according to the local format for the radionavigation receiver, of signals derived from the received phases by the latter, and in accordance with the phase corrections from the synchronous filters.

16. A correction receiver in accordance with claim 12, for use with a radionavigation receiver supplying individual received phases, wherein the means for application of phase corrections contains a correctionsignal demultiplexer, followed by a plurality of synchronous filters for recovery of the phase corrections with the precited time constant, and also a plurality of dephasers, each for modifying one received phase in accordance with the corresponding phase correction.

17. A correction receiver in accordance with claims 12, additionally comprising means for generating phase-correction values as a function of time from recorded base values, and also means for applying these correction values to the received phases of the radionavigation system.

18. A correction receiver in accordance with claim 17, wherein the two means for application of phase corrections are arranged for simultaneous action, the correction base values here being differential values, each equal to the difference between the correction in respect of the domain where the receiver is to be found and the correction for the selected site prescribed, defining the corrections transmitted.

* * * * *